(12) United States Patent
Karmarkar et al.

(10) Patent No.: US 8,990,671 B2
(45) Date of Patent: Mar. 24, 2015

(54) METHOD AND SYSTEM OF JAMMING SPECIFIED MEDIA CONTENT BY AGE CATEGORY

(75) Inventors: Amit Vishram Karmarkar, Palo Alto, CA (US); Richard R. Peters, Mill Valley, CA (US)

(73) Assignee: Buckyball Mobile Inc., Palo Alto, CA (US)

(*) Notice: Subject to any disclaimer, the term of this patent is extended or adjusted under 35 U.S.C. 154(b) by 172 days.

(21) Appl. No.: 13/423,128

(22) Filed: Mar. 16, 2012

(65) Prior Publication Data
US 2013/0111312 A1 May 2, 2013

Related U.S. Application Data

(60) Provisional application No. 61/553,912, filed on Oct. 31, 2011, provisional application No. 61/569,272, filed on Dec. 11, 2011.

(51) Int. Cl.
| | |
|---|---|
| G06F 17/22 | (2006.01) |
| G11B 27/031 | (2006.01) |
| G06F 21/62 | (2013.01) |
| H04L 29/06 | (2006.01) |
| G11B 27/10 | (2006.01) |
| G11B 27/30 | (2006.01) |
| G06F 17/24 | (2006.01) |

(52) U.S. Cl.
CPC .......... G11B 27/031 (2013.01); G06F 21/6218 (2013.01); H04L 63/104 (2013.01); G11B 27/105 (2013.01); G11B 27/3027 (2013.01); G06F 2221/2149 (2013.01)

USPC .......................................... 715/201; 715/202

(58) Field of Classification Search
USPC ........................................................ 715/201
See application file for complete search history.

(56) References Cited

U.S. PATENT DOCUMENTS

| | | | |
|---|---|---|---|
| 2002/0152135 A1* | 10/2002 | Beeri et al. ...................... 705/27 |
| 2003/0028532 A1* | 2/2003 | Dougu et al. ...................... 707/9 |
| 2004/0198456 A1* | 10/2004 | Kelkar ............................. 455/566 |
| 2007/0098235 A1* | 5/2007 | Halavee et al. ................ 382/124 |
| 2007/0260603 A1* | 11/2007 | Tuscano et al. .................... 707/9 |
| 2007/0271220 A1* | 11/2007 | Carter ................................ 707/2 |
| 2010/0251336 A1* | 9/2010 | Allen et al. ........................ 726/4 |
| 2011/0225652 A1* | 9/2011 | Emigh et al. .................... 726/22 |
| 2011/0235807 A1* | 9/2011 | Hayashi et al. ................. 381/17 |
| 2011/0283311 A1* | 11/2011 | Luong ............................. 725/28 |
| 2012/0020300 A1* | 1/2012 | Sheriff et al. ................. 370/328 |
| 2013/0040629 A1* | 2/2013 | Sprigg et al. .................. 455/419 |
| 2013/0132567 A1* | 5/2013 | Jiang et al. .................... 709/224 |

* cited by examiner

*Primary Examiner* — James J Debrow

(57) ABSTRACT

In one exemplary embodiment, a computer-implemented method includes receiving a web page with a web browser in a computing device. A jamming trigger term is received from a database stored in the computing device. A targeted age group is also received. The jamming trigger term is located in the web page. An instruction is provided to an audio system of the computing device to play a sound wave at a frequency. The frequency is audible by the targeted age group but not an older age group according to a frequency audibility table. A web scrapping operation can be performed on the web page after the web page is downloaded by the web browser. The targeted age group can be persons eighteen years of age and younger and wherein the frequency comprises a twenty kilo-hertz value (20 kHz).

20 Claims, 11 Drawing Sheets

METHOD AND SYSTEM OF JAMMING SPECIFIED MEDIA CONTENT BY AGE CATEGORY

CROSS-REFERENCE TO RELATED APPLICATIONS

This application claims priority from U.S. Provisional Application No. 61/553,912, filed Oct. 31, 2011 and U.S. Provisional Application No. 61/569,272, filed Dec. 11, 2011. The provisional applications are hereby incorporated by reference in their entirety.

BACKGROUND

1. Field

This application relates generally to digital media, and more specifically to a system and method for jamming specified media content by age category.

2. Related Art

It is known that a person's ability to hear high-frequency sound decreases with age. For example, persons under eighteen (18) years of age can typically hear eighteen (18) kHz sounds that most adults older than thirty (30) cannot hear. The following frequency audibility table demonstrates high-frequency sound threshold level for that various age groups. (It is noted that other frequency audibility tables can also be utilized according to various studies of age-related frequency hearing loss).

| Frequency | Age Group |
|---|---|
| 8 kHz | Everyone |
| 10 kHz | 60 & Younger |
| 12 kHz | 50 & Younger |
| 14.1 kHz | 49 & Younger |
| 14.9 kHz | 39 & Younger |
| 15.8 kHz | 30 & Younger |
| 16.7 kHz | 24 & Younger |
| 20 kHz | 18 & Younger |

Furthermore, the digital distribution of digital entertainment content via the Internet has increased significantly. Various types of entertainment content such as digital television and movie services, user-uploaded videos and digital music are now widely and easily accessible to anyone with Internet access. For example, various web sites now provide television shows, uploaded user videos and streaming movies that can be accessed through such ubiquitous devices as smart phones and tablet computers. At the same time, digital media receivers (DMR) give users the ability to obtain digital entertainment content from the Internet and play it on a home theater system or television (e.g. a 'smart TV'). Accordingly, the demarcating lines between more traditional mediums of providing entertainment content and the Internet have become increasingly blurred.

In this context, controlling access to digital entertainment content has become increasing important and difficult. Traditional forms of controlling Internet access (e.g. parental controls, workplace controls, etc.) often rely on blocking entire web sites and/or types of digital entertainment content. Controlling access to digital entertainment is often based on age-related concerns. For example, a parent may use a website blocking method to prevent children from accessing certain websites or watching certain television shows. Blocking methods can be inconvenient. The parent may need to deblock a web page in order to access it, and then reblock it afterwards. Such constant inconveniences can discourage use of parental controls. Thus, a system and method of jamming specified media content according age categories is needed.

BRIEF SUMMARY OF THE INVENTION

In one exemplary embodiment, a computer-implemented method includes receiving a web page with a web browser in a computing device. A jamming trigger term is received from a database stored in the computing device. A targeted age group is also received. The jamming trigger term is located in the web page. An instruction is provided to an audio system of the computing device to play a sound wave at a frequency. The frequency is audible by the targeted age group but not an older age group according to an audible range of frequencies based on age groups.

A web scrapping operation can be performed on the web page after the web page is downloaded by the web browser. The targeted age group can be persons eighteen years of age and younger and wherein the frequency comprises a substantially a twenty kilo-hertz value (20 kHz). Another instruction can be provided to the audio system to stop playing the sound wave if the web page is no longer displayed by the web browser.

In another exemplary embodiment, a computer-implemented method can include obtaining a digital media content. A targeted age-group category is obtained. A sound wave frequency that is audible by the targeted age-group category is determined. The sound wave frequency is not audible by another age-group category (e.g. an older age-group category). A target attribute of the digital media content is obtained. The digital media content is searched for the attribute. A computing device used to provide the digital media content to a user is triggered to play a sound wave at the sound wave frequency if the target attribute is located.

The digital media content can be a web page, a digital audio file, a video stream and the like. The target attribute of the digital media content can be a restricted content as provided by a system administrator of the computing device used to provide the digital media content to the user. The restricted content can be a ratings category associated with the digital media content, an unlicensed state of the digital media content, a key word and the like.

BRIEF DESCRIPTION OF THE DRAWINGS

The present application can be best understood by reference to the following description taken in conjunction with the accompanying figures, in which like parts may be referred to by like numerals.

DETAILED DESCRIPTION OF THE INVENTION

Disclosed are a system, method, and article of manufacture for jamming specified media content according age categories. Although the present embodiments have been described with reference to specific example embodiments, it will be evident that various modifications and changes may be made to these embodiments without departing from the broader spirit and scope of the particular example embodiment.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
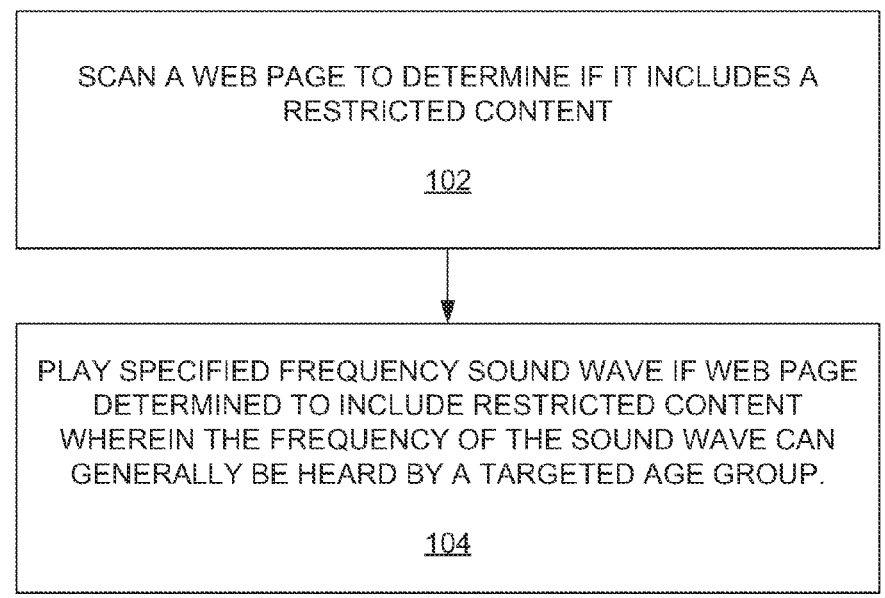
FIG. 1 depicts an example process of web page jamming, according to some embodiments.

FIG. 1 depicts an example process 100 of web page jamming. In step 102, a web page is scanned to determine if it includes restricted content. For example, the components of an HTML document can be scanned for one or more terms and/or certain annotations. As used herein, a web page can include a document or information resource that is suitable for the World Wide Web and can be accessed through a web browser and displayed on a monitor or mobile device. The restricted content can include text, audio, image and/or video content. The restricted content can be preset by a user. For example, a user can select subject matter, specific terms (as a string type), types of images, image content, video content, types of media (e.g. mp3), universal resource locator (URL) data, attributes of the web page document (e.g. a flash plug-in) and the like (and in any combination thereof) as the restricted content. For example, a list of restricted content that includes pornographic images, celebrity names, and the like can be provided by a user. In another example, a user can input terms to be included in the restricted content that is searched for in the web page document. In some embodiments, a script (e.g. a java script file) can run in a web browser (e.g. as part of an extension to the web browser) to implement the scan of a web page retrieved and/or presented by the web browser. The process of scanning the web page can be done when the page is uploaded, periodically, and/or at an event (such as a tab select operation and/or an asynchronous web application operation).

If the web page (or a portion thereof) is determined to include the restricted content, one or more sound waves can be played at least one specified frequency in step 104. The specified frequency can be chosen such that it is heard by a targeted age group (e.g. ~20 kHz for persons eighteen years and younger). The volume of the sound wave can be set according to such factors as matching the current volume of the computer system, exceeding the volume of the computer system by a specified value (e.g. in order to prevent the underlying content from being comprehensible by a listener), the type of speakers in the computer system, and the like.

Optionally, the action of web page elements such as audio and video elements can be monitored. If the audio or video element is running, the sound wave can be played at a volume such that the audio portion is difficult to impossible to hear by a person capable of hearing the frequency of the sound wave. In this example, the text and image web page content can be viewed but the audio content can be jammed.

In one example embodiment, a Chrome® extension can be implemented in a Chrome® web browser. A JavaScript file can be written to scan the content of each web page the web browser uploads. The JavaScript file can pass a message to a background HTML5 web page that is also a part of the extension to play the sound wave if restricted content is located in the uploaded web page. Optionally, a pop-up window can be provided to a user to choose and set such parameters as the jamming sound frequency, restricted content as well as other criteria for jamming an uploaded web page. In this example, various other HTML5 and/or Chrome® extension applications can be utilized to jam web pages viewed with a Chrome® web browser (e.g. the local storage application of HTML5 can be utilized to store restricted content). The embodiments are not limited by this example and other types of web browsers and programming languages can be utilized according to various other web browser designs and types. Other embodiments are not limited by this particular example.

Optionally, a pre-recorded message can be utilized in lieu of and/or with the sound wave. For example, a message reminding the web page user of a set of rules regarding use of the Internet can be played. In one example, the pre-recorded message can be played intermittently in between periods of high-frequency sound wave jamming.

It is noted that the sound wave can be designed to cause a variety of reactions in a user. For example, the sound wave can be of such a high volume that the user cannot hear other audio content accessed via the web browser. In another example, the sound wave can be designed to merely annoy the user. For example, the volume of the sound wave can be modulated from zero to the current volume at a rate such that it is only intermittently heard by a user of the targeted age group.

One or more databases can be created to store data related to process 100. For example, a database can include restricted content to 'jam', web browsing history, administrator login and password information (e.g. a pass code that can be required to set the sound frequency and/or restricted content to 'jam'), user behavior data (e.g. any user input such as mouse actions, typed input, etc.) that occurs when a 'jamming' sound is played, and the like.

Figure 2:
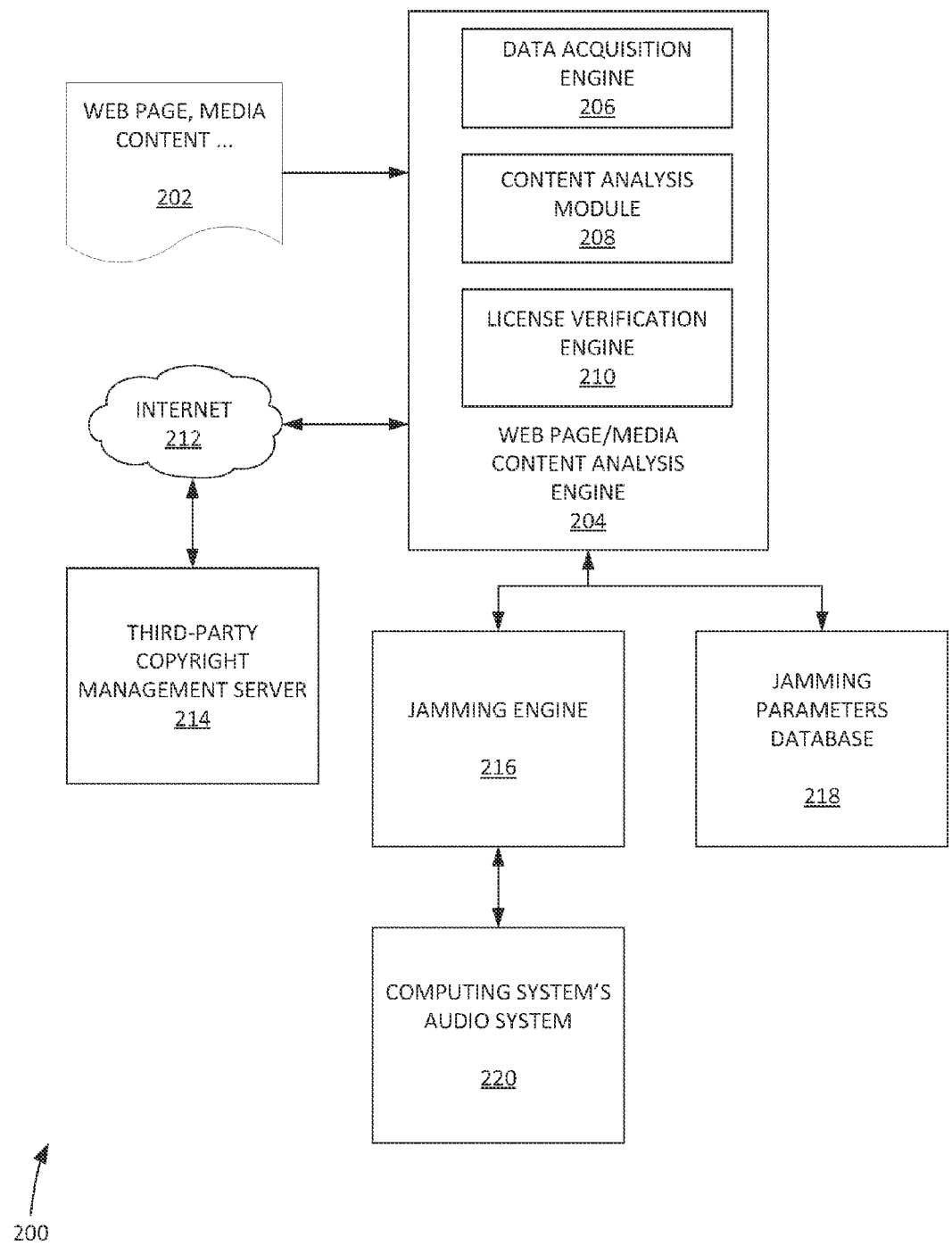
FIG. 2 depicts an exemplary system for jamming specified media content by age category, according to some embodiments.

FIG. 2 depicts an exemplary system 200 for jamming specified media content by age category, according to some embodiments. A web page 202 can be provided to a webpage/media content analysis engine 204 (hereafter analysis engine 204). In some embodiments, analysis engine 204 can reside in a client application such as a web browser that accesses one or more web servers and the like via the Internet. It is noted that in some embodiments, a media content can be obtained with and/or in lieu of a web page. Media content can include any image, audio and/or video file format (e.g. mp3, mp4, wav, ogg, jpeg, MPEG-4, AVC, SWF and the like). Thus, analysis engine 204 can include various modules to analyze the content of web pages and/or media content received by a web browser or other computer programs (e.g. a software-based online digital media store) that import media content files over the Internet. It is noted that in some embodiments, analysis engine 204 can instead reside in a server that serves web pages and/or media contents to a client-side application. Example servers include web servers, rich media servers (e.g. an Adobe Flash® media server), digital rights management (DRM) servers, and the like.

It is noted that in the server-side example, a server can include high-frequency sound waves into a web page and/or media content prior to forwarding to a client-side application such as a web browser, media player and the like. For example, an administrator can log into a web-based interface with the server-side analysis engine and input parameters of the included sound wave such as frequency value, modulation attributes, DRM parameters (e.g. various DRM schemes can be utilized such as jamming all media content without a verified license, from an unauthorized Internet resource such as a uniform resource locator (URL) and/or from an URL that has been flagged for providing unauthorized media content), and the like. In one example, server-side analysis engine can operate as an intermediary for requests from a client seeking resources from other servers.

Analysis engine 204 can include a data acquisition engine 206. Data acquisition engine 206 can extract data from web page documents and/or media content. Data acquisition engine 206 can utilize various data extraction techniques depending on the file type/object from which the data is obtained. For example, if the file is a web page, can use screen scraping, web indexing and/or web scrapping (e.g. text grepping and regular expression matching, HTTP programming, Data mining algorithms, DOM parsing, HTML parsers, Web-scraping software, Vertical aggregation platforms, Semantic annotation recognizing, etc.). It is noted that data acquisition engine 206 can also include other modules for determining the content of web page and/or media content. For example, data acquisition engine 206 can include various functionalities for determining the subject matter of image and/or video files (e.g. obtain associated alt tags, text-to-speech functionalities that convert audio data to text and the like, search subtitles). Additionally, data acquisition engine 206 can utilize an API (when available) to query a source of the web page and/or media content in order to ascertain its content. Data acquisition engine 206 can obtain types of data based on the types of content to be jammed. For example, if jamming parameters database 218 includes textual terms, then data acquisition engine 206 can obtain text from web pages. In another example, if jamming parameters database 218 includes audio content to be jammed, then data acquisition engine 206 can convert audio files into text, obtain an associated alt tag (or other descriptive metadata), and the like. In yet another example, if jamming parameters database 218 includes an image and/or video content to be jammed, then data acquisition engine 206 can utilize metadata associated with an image and/or video file, perform content-based image retrieval (CBIR), and the like. Data acquisition engine 206 can format data for analysis by the content analysis module 208 (e.g. provide a textual description of audio, image and/or video content as a searchable string).

Content analysis module 208 can obtain data from data acquisition engine 206. Content analysis module 208 can determine if the data matches restricted content (e.g. using string searching algorithms as well as other techniques for finding an item with specified properties among a collection of items) to be jammed as provided by a user (e.g. a parent, a system administrator, a teacher, etc.) and stored in jamming parameters database 218. If content analysis module 208 finds any content to be jammed in the data provided by data acquisition engine 206, it can provide an instruction to jamming engine 216 to jam the presentation of web page and/or media content according to a targeted age group. An example of a jamming sound wave can include playing a sound wave (e.g. with computing system's audio system 220) at a frequency that can generally be heard by an age group (as well as younger age groups). The particular frequency can generally not be heard by age groups older than the targeted age group. For example, the table pairing age groups and frequency levels provided supra can be utilized. In this way, particular age groups can be targeted. The volume of the sound wave can be set to interfere with any audio content provided by the web page (e.g. irritate a user viewing a web page and/or substantially block out audio content).

For example, the web site can be a video-sharing website (e.g. YouTube®). The web page can include access to streaming video and audio content as well as metadata about the content. Data acquisition engine 206 can obtain the metadata and pass it on to the content analysis module 208 in a searchable format (e.g. in a text format). Content analysis module 208 can search the text and locate a term that is in a list of restricted content to jam. Content analysis module 208 can then instruct the jamming engine 216 to jam the content.

Jamming engine 216 can monitor the current state of the web browser and/or other media players in the computer system and continuing jamming as long as the content to jam is available to a user. For example, jamming engine 216 can cause the jamming sound wave to be played if the web page including content to jam remains viewable with the web browser (e.g. selecting the web page's tab can trigger the playing of the jamming sound wave). If another web page is navigated to, then jamming engine 216 can cause the jamming sound wave to stop playing (e.g. selecting a tab for another web page tab can trigger the playing of the jamming sound wave to stop). In another example, jamming engine 216 can continue to cause the sound wave to be played until the web browser application is closed. These and other jamming parameters can be obtained from jamming parameters database 218. Jamming engine 216 can control the volume of the jamming sound wave according to such factors as the current volume of the computing system's audio system 220, the length of time the sound wave has been played for (e.g. can increase volume with time) and the like. In this way, high-frequency audio sounds can be overlaid over audio and/ or video content. The embodiments are not limited by these examples. It is noted that jamming engine 216 can also be set to jam other levels providing media content such at the channel level (e.g. jam a set of channels at a 20 kHz regardless of content, jam certain restricted content on a specified set of channels, etc.), the application software level (e.g. jam media content provided by a particular mobile device 'app'), by media content country of origin, media content language and/or media content genre level. These parameters may be provided by a user through an interface (e.g. media center software application such as Front Row®, a satellite television user interface, a DVR-type user interface and the like) with which a user can set various jamming parameters (e.g. targeted age group, time periods for jamming, sound wave characteristics, specified blocks of media content (see description of FIG. 8 infra) to be jammed, define restricted content and the like).

It is noted that system 200 and more particularly analysis engine 204 can also support, various forms of digital rights management schemes as well. In some embodiments, license verification engine 210 can determine if the media content accessed by the web browser is properly licensed to be available on the web page. License verification engine 210 can obtain information about media content licensing from other entities such as a third-party copyright management server. If the media content is not properly licensed (e.g. is an unauthorized upload of a movie on YouTube®, is an illegally downloaded audio file, is not provided by a listed approved URL, etc.), the license verification engine 210 can instruct the jamming engine 216 to play the jamming sound wave.

Computing system's audio system 220 can include any hardware and/or software of a computing system that can play the jamming sound wave. This can include speakers, sound cards, speaker drivers, volume control software, audio processing software and the like. Audio system 220 can play more than one audio file at a time. In this way, an audio stream from a web page can be played with a jamming sound wave laid over it. Jamming parameters database 218 can also include user information that can enable the analysis engine 204 to determine a proper sound wave frequency according to the age of a user currently logged into the computing system. The systems of FIG. 10 and FIG. 11 can be configured to implement some embodiments of FIG. 2.

In one example, web page 202 can include user-readable text. Data acquisition engine 206 can obtain the user-readable text and provide it to other modules (such as content analysis module 208) in the analysis engine 204. The user-readable text can be placed into a text file accessible by content analysis module 208. Content analysis module 208 can parse the text and match strings in the text with a list of prohibited strings (an example of restricted content) obtained from a system administrator (e.g. as stored in jamming parameters database 218). If a match is found, content analysis module 208 can instruct jamming engine 216 to jam the web page (e.g. use the computer system's audio system 220 to play a sound wave at a specified frequency that can generally be heard by a certain age group but not an older age group) while the web page is being viewed on the web browser.

Figure 3:
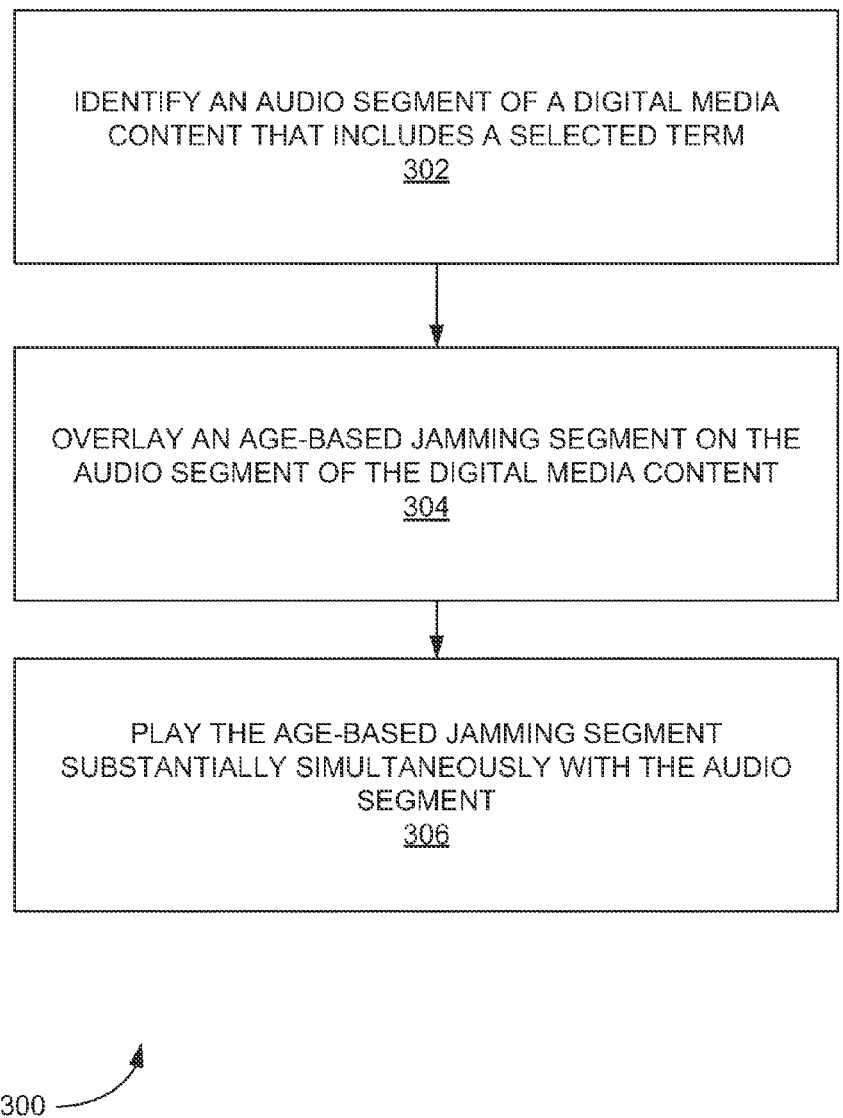
FIG. 3 illustrates an exemplary process for age-based jamming of specified terms in digital media content, according to some embodiments.

FIG. 3 illustrates an exemplary process 300 for age-based jamming of specified terms in digital media content. In step 302 of process 300, an audio segment of a digital media content that includes a specified term is identified. The digital media content can be audio and/or visual media in a digital format (e.g. a podcast, a song, internet radio content, a motion picture in a digital format, a television show in digital format, videos on video-sharing websites such as YouTube® video and the like). In one example, the specified term can be a profane term for example. In another example, a user can select and/or input any term into the system. The audio segment length can vary in length according various parameters. For example, the audio segment can be the portion of the audio thread that is substantially coequal to the specified term. A filter functionality that includes various other functionalities such as voice-to-text, text search, metadata analysis, subtitle search, search-engines and other media content analysis modules can determine where the specified terms is located in the digital media content and/or whether the digital media content includes the specified terms. In another example, the audio segment can include the entire media content that includes the specified term (e.g. an entire YouTube® video that includes a segment with profanity). In step 304, an age-based jamming segment can be overlaid on the audio segment of the digital media content (e.g. with a track mixing functionality). In step 306, the age-based jamming segment can be played substantially simultaneously with the audio segment. For example, if the audio track is being analyzed in the substantially real-time to located the specified term, then a slight latency may exist due to computational processes and the like. In other examples, other types of content (e.g. images, subject matter, music type, originator, geographic origin and the like), not just specified terms can be used as the basis for determining whether to jam all or part of a digital media content. The systems of FIG. 10 and FIG. 11 can be configured to implement some embodiments of process 300.

Figure 4:
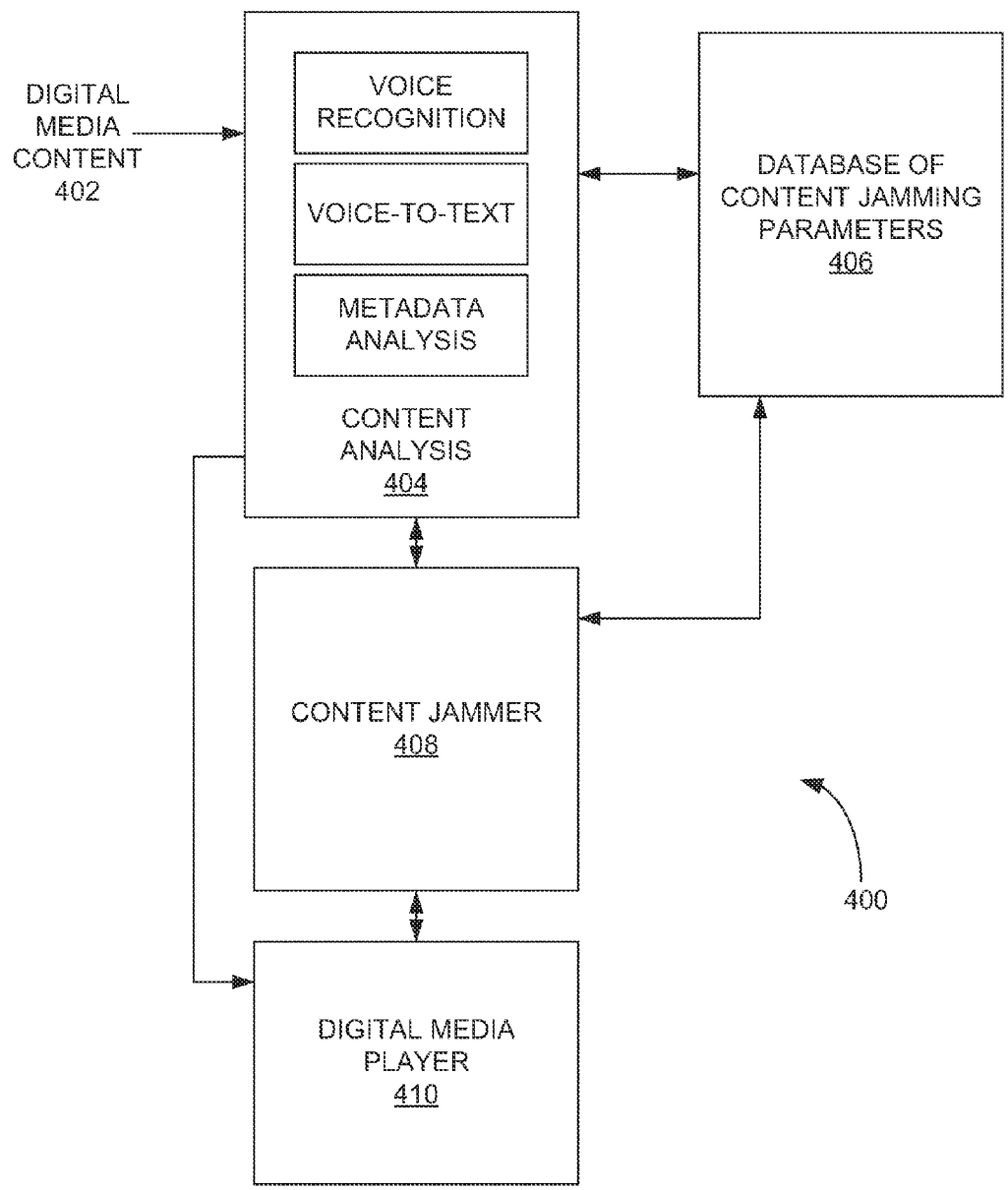
FIG. 4 depicts an exemplary system of jamming specified media content by age category, according to some embodiments.

FIG. 4 depicts an exemplary system of jamming specified media content by age category. Digital media content 402 can be obtained by a content analysis module 404. Content analysis module 404 can include functionalities for determining information about and properties of the digital media content 402 such as the content's identity, origin, subject matter, metadata about the content, text, words, phrases, images and other matter included in the media content 402 as well, etc. Content analysis module 404 can also query database 406 to determine if any of the information and/or properties of the media content 402 (or other parameters such as time of day, user identity, age of users to target jamming sounds to and the like) initiate a content jamming operation. If so, this information and the media content 402 can be passed to content jammer 408. Content jammer 408 can then insert age-appropriate jamming sounds into the appropriate locations of the media content 402 based on the parameters found in database 406. The media content 402 (with age-appropriate jamming sounds) can then be passed to digital media player 410.

In one example embodiment, content analysis module 404 can analyze incoming media content that is being played on media player 410 in substantially real time (assuming processing and networking delays). Content jammer 408 can be set to include jamming sounds if and when a prohibited term is used, or a particular person's voice is detected, or genre of music is played and the like. Content jammer 408 can be set to include jamming sounds at various levels of granularity form all content to particular terms according to the parameters in database 406. Thus, in some cases, content jammer 408 can perpetually include various types of jamming sounds in media content. For example, if a television show includes a certain profanity term than each instance of the television can be jammed until it is reset by an administrator (e.g. a parent). System 400 can email, text and otherwise communicate jamming states to an administrator. System 400 can include password and other user login systems to ensure the identity of the various users. The systems of FIG. 10 and FIG. 11 can be configured to implement some embodiments of FIG. 4.

Figure 5:
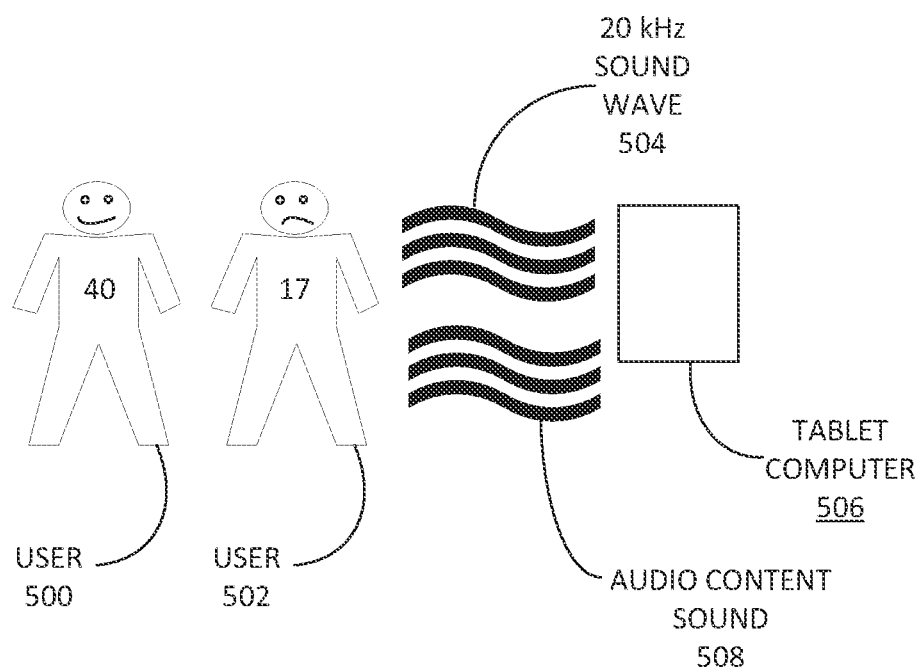
FIG. 5 depicts, in a schematic manner, an implementation of jamming specified media content by age category, according to some embodiments.

FIG. 5 depicts, in a schematic manner, an implementation of jamming specified media content by age category, according to some embodiments. User 500 and user 502 can be in the physical proximity of tablet computer 506. User 500 can be forty (40) years of age and user 502 can be seventeen (17) years of age. Tablet computer 506 can play audio content sound 508 (e.g. a song obtained from a digital file, an audio track of a digital video and the like). Additionally, a module of tablet computer 506 can detect that the audio content file used for audio content sound includes and/or is associated with an attribute (e.g. descriptive metadata term, prohibited web page, flagged lyrics, unlicensed source and the like) that is listed to initiate a jamming operation. The jamming operation also includes a targeted age group, which, in the present example, is eighteen (18) and younger. Thus, tablet computer 506 can play a high-frequency (in relation to the normal human auditory range for example) sound such as twenty (20) kHz sound wave 504. The sound wave 504 may not be audible user 500 but may be audible by user 502. Thus, user 500 can listen to audio content sound 508 without disturbance by sound wave 504. At the same time, user 502 can hear both sound wave 504 and audio content sound 508. In this way, sound wave 504 can obstruct user 502's ability to listen to audio content sound 508 without disturbance. In one example, sound wave 504 can be played at a volume sufficient for blocking out audio content sound 508 (e.g. at a higher volume). In another example, the volume of sound wave 504 can be modulated in order to annoy user 502. Sound wave 504 can be turned off if audio content sound 508 is no longer played by tablet computer 506, or for other reasons such as a license is obtained to play audio content sound 508, etc.

In one example, tablet computer 506 can function as a cellular phone. An application (e.g. a modified version of system 200 and/or 400) can be included in tablet computer 506 that enables a user to jam calls to specified numbers at a specified frequency. For example, user 500 may be an administrator of tablet computer 506. User 500 may not want tablet computer 506 to be used for outgoing/ingoing calls to a specified number (or set of numbers associated with a specified person). The numbers can be cellular/telephone numbers, voice-over-Internet Protocol service user identification (e.g. a Skype® name, etc.), and the like. The application can monitor cellular services, video calling services (e.g. a Face Time® application in a smart phone) and/or voice-over-Internet Protocol services. If a connection to a prohibited number/id is detected, the application can cause a specified frequency (e.g. 18 kHz) to be played. In another example, the frequency can be played contemporaneously only with the playing of the voice of the other party. In yet another example, the application can input a specified frequency into the outgoing voice signal of the party using tablet computer 500 such that it will be played on the remote receiving device. Voice identification software can be used to monitor calls. For example, if a prohibited voice is identified in a call, the specified frequency can be played. In another example, if the present user's voice does not match with a user with permission to make calls with the tablet computer 500, then the specified frequency can be played.

Figure 6:
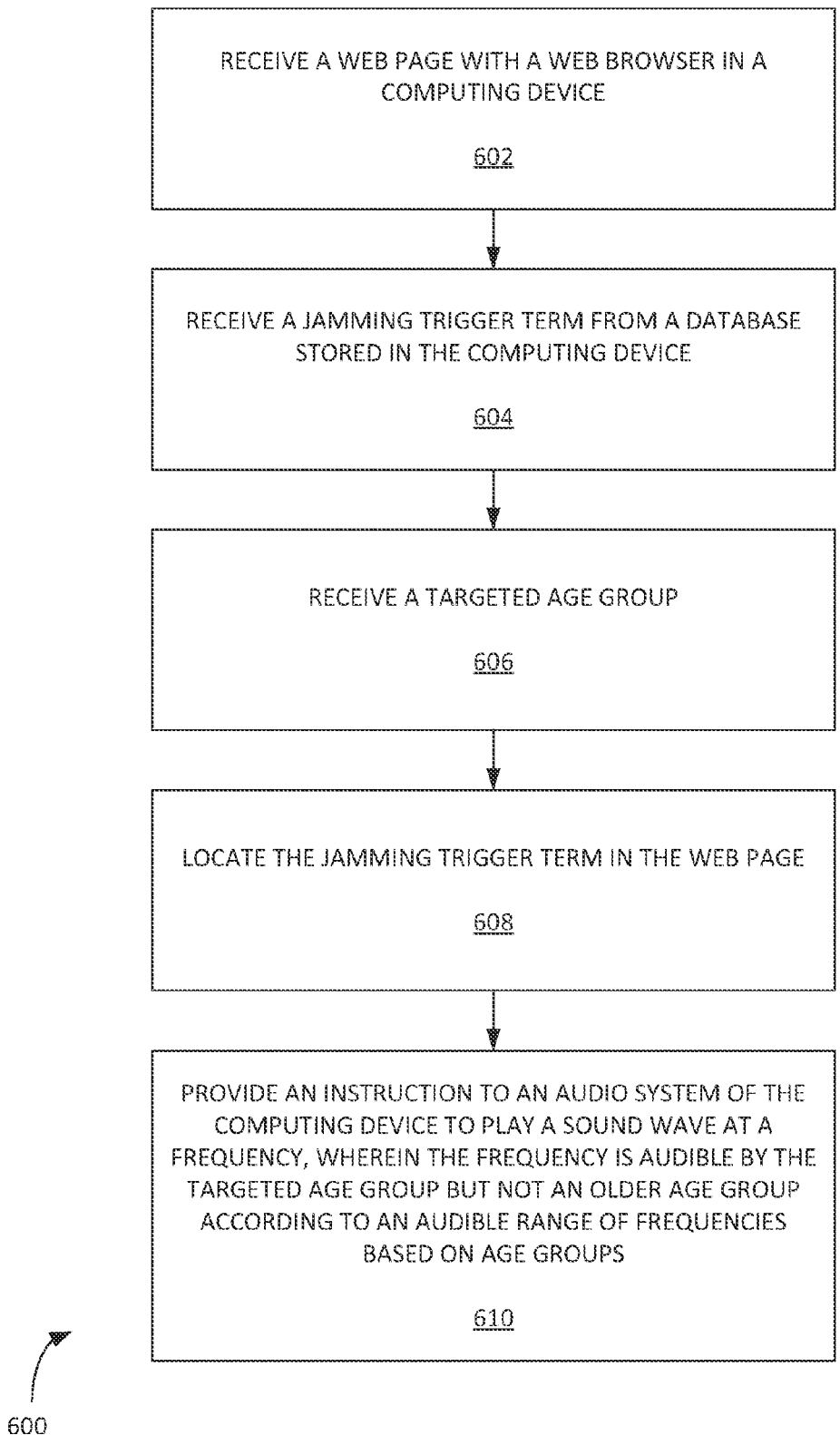
FIG. 6 depicts an example process of jamming specified media content by age category, according to some embodiments.

FIG. 6 depicts an example process 600 of jamming specified media content by age category, according to some embodiments. In step 602, of process 600, a web page can be received with a web browser in a computing device. In step 604, a jamming trigger term can be received from a database stored in the computing device. A jamming trigger term can be a key word(s) provided by a parent and/or system administrator. A targeted age group is also received in step 606. In step 608, the jamming trigger term is located in the web page. For example, a web scrapping operation can be performed on the web page after the web page is downloaded by the web browser. In step 610, an instruction can be provided to an audio system of the computing device to play a sound wave at a frequency. The frequency can be audible by the targeted age group but not an older age group according to a frequency audibility table. For example, the targeted age group can be persons eighteen years of age and younger and wherein the frequency can be a twenty kilo-hertz (20 kHz).

Figure 7:
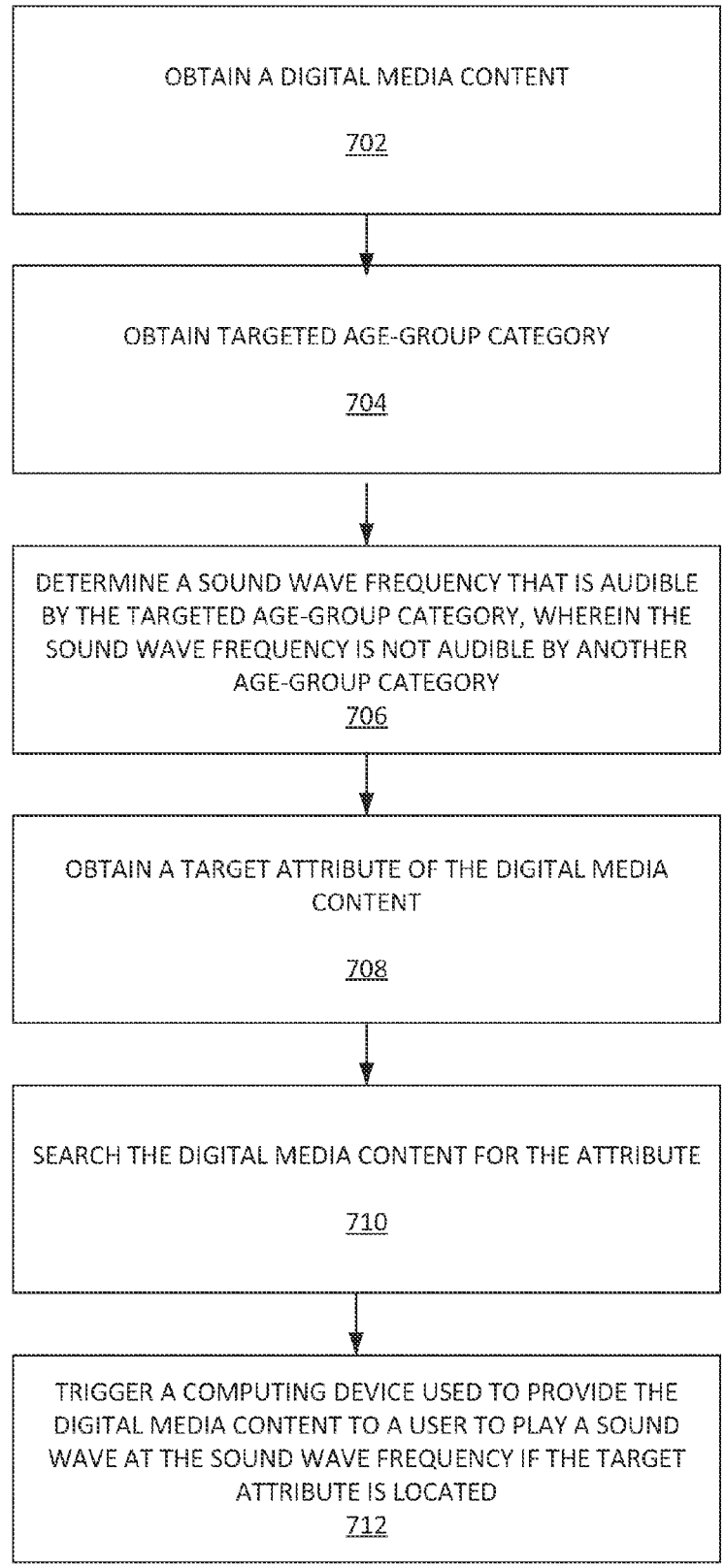
FIG. 7 depicts another example process of jamming specified media content by age category, according to some embodiments.

FIG. 7 depicts another example process 700 of jamming specified media content by age category, according to some embodiments. In step 702, digital media content can be obtained. The digital media content can be a web page, a digital audio file, a video stream and the like. A targeted age-group category is obtained in step 704. In step 706, a sound wave frequency that may be audible by the targeted age-group category is determined. The sound wave frequency may not be audible by another age-group category (e.g. an older age-group category). In step 708, a target attribute of the digital media content is obtained. The target attribute of the digital media content can be a restricted content as provided by a system administrator of the computing device used to provide the digital media content to the user. The restricted content can be a ratings category associated with the digital media content, an unlicensed state of the digital media content, a key word and the like. In step, 710, the digital media content is searched for the attribute. In step 712, a computing device used to provide the digital media content to a user is triggered to play a sound wave at the sound wave frequency if the target attribute is located.

Figure 8:
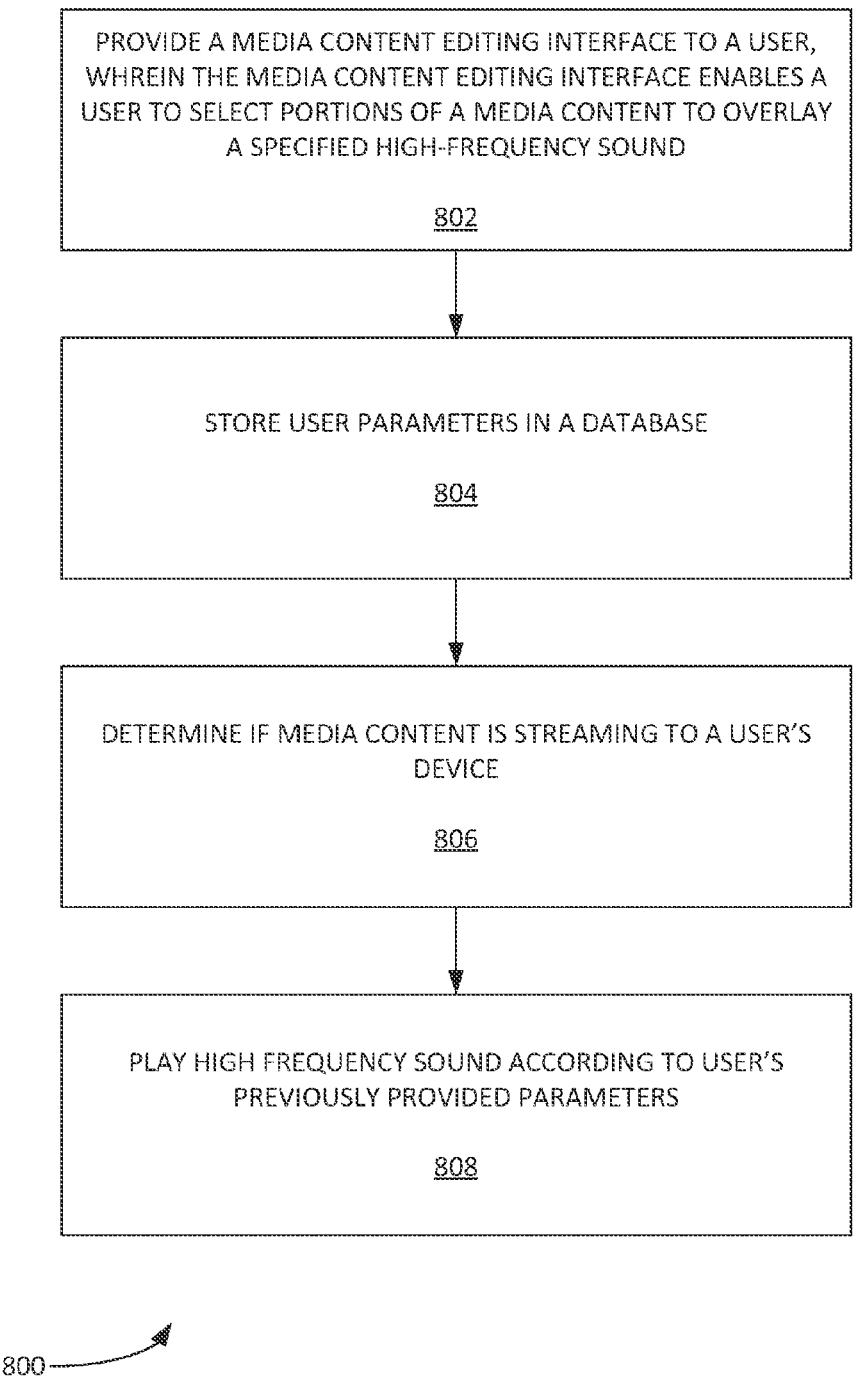
FIG. 8 depicts an example process 800 of jamming specified media content by age category, according to some embodiments.

FIG. 8 depicts an example process 800 of jamming specified media content by age category, according to some embodiments. In step 802 of process 800, a media content editing interface can be provided to a user. The user may be a system administrator, a parent and the like. A user authentication process may be utilized to allow the user to access the media content editing interface. The media content editing interface (e.g. as provided by media content editor 1002 infra) can enable the user to select portions of a media content to overlay a specified high-frequency sound (e.g. twenty (20) kHz). A user can also input certain descriptive parameters (e.g. terms, ratings, images, etc.). A search module can then search the media content for segments that include the parameters provided by the user and overlay the specified high-frequency sound over the application segment of media content. A user can specify the length of the segment. It is noted that steps 802 can be performed while a user is access media content. For example, a parent can be watching a film via Apple TV®. The parent may decide to jam certain scenes and/or set the scenes with the specified restricted content jammed. The parent can pause the movie and then access the jamming interface (e.g. as a popup window) and input his jamming options (e.g. with input fields in the media content editing interface). In this way, if a child then later accesses the film via the Apple TV®, the relevant portions of the film can be jammed. The parameters as well as any user-selected segments in a database (e.g. jamming parameters database 218) in step 804. In step 806, it can be determined if the media content is streaming (or in other examples being otherwise provided in a manner other than streaming) to the user's media device and/or application. In step 808, the high-frequency sound is played according to the user's previously provided parameters.

Figure 9:
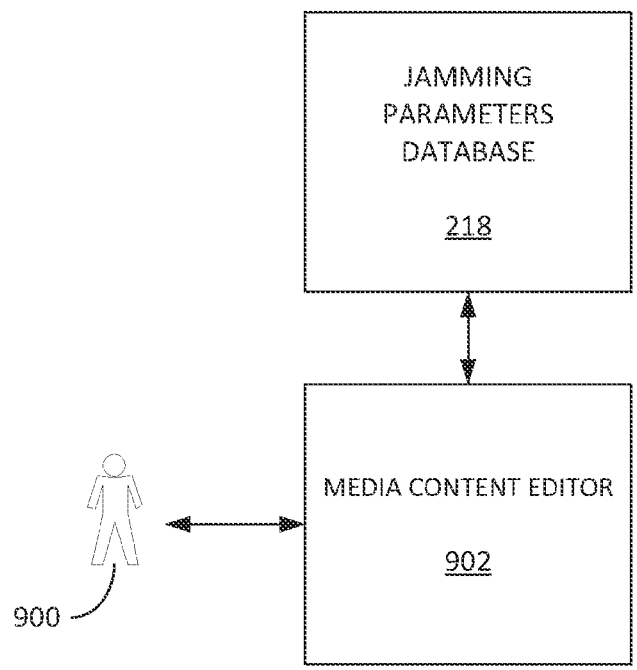
FIG. 9 is a block diagram of a sample computing environment to implement some embodiments.

FIG. 9 is a block diagram of a sample computing environment to implement some embodiments, jamming parameters database 218 (and in some embodiment database 406 of FIG. 4) can be communicatively coupled with media content editor 902. Media content editor 902 can provide a media content editing interface to user 904. In this way, user 904 can select portions of a media content to overlay a specified high-frequency sound (e.g. twenty (20) kHz). A user can also input certain descriptive parameters (e.g. terms, ratings, images, etc.) regarding restricted content to be jammed by the systems of FIG. 2 and FIG. 4, Media content editor 902 can include various audio and/or video-editing software module (e.g. Final Cut Pro® and Adobe Premiere®) that have been configured to allow user to indicate portions of a media content to overlay a high-frequency sound as well as other attributes of the high-frequency sound (e.g. volume, length, frequency, modulation of sound wave and the like). It is noted that in some embodiments media content editing interface can accept user voice input as well. For example, a user can set various jamming parameters through voice input: "set frequency at eighteen kilo hertz", "jam all television shows tomorrow for people under twenty", "jam all cartoons", "jam this show the next time it is on", "jam the telephone number 555-5555 when called from this cell phone", and the like. Voice recognition software can be used to authenticate a user with permission to modify the jamming parameters.

Figure 10:
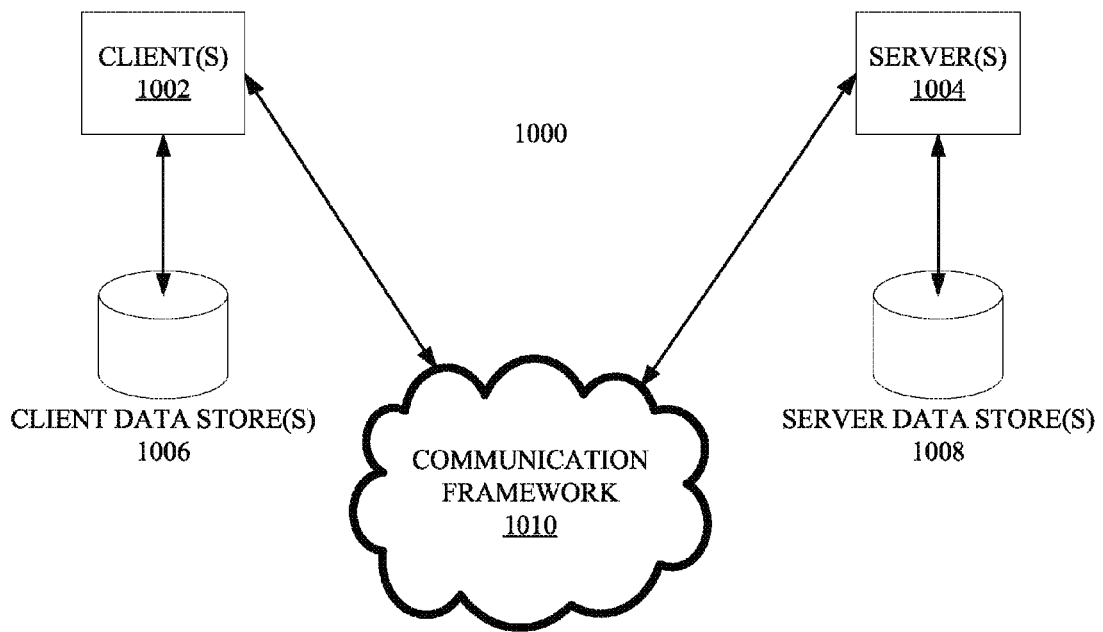
FIG. 10 is a block diagram of a sample computing environment that can be utilized to implement some embodiments.

FIG. 10 is a block diagram of a sample computing environment 1000 that can be utilized to implement some embodiments. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1010 that can be employed to facilitate communications between the client(s) 1002 and the server(s) 1004. The client(s) 1002 are connected to one or more client data store(s) 1006 that can be employed to store information local to the client(s) 1002. Similarly, the server(s) 1004 are connected to one or more server data store(s) 1008 that can be employed to store information local to the server(s) 1004. In some embodiments, system 1000 can be include and/or be utilized by the various systems and/or methods described herein to implement processes described herein such as process 100, process 300, process 600 and process 700.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

Figure 11:
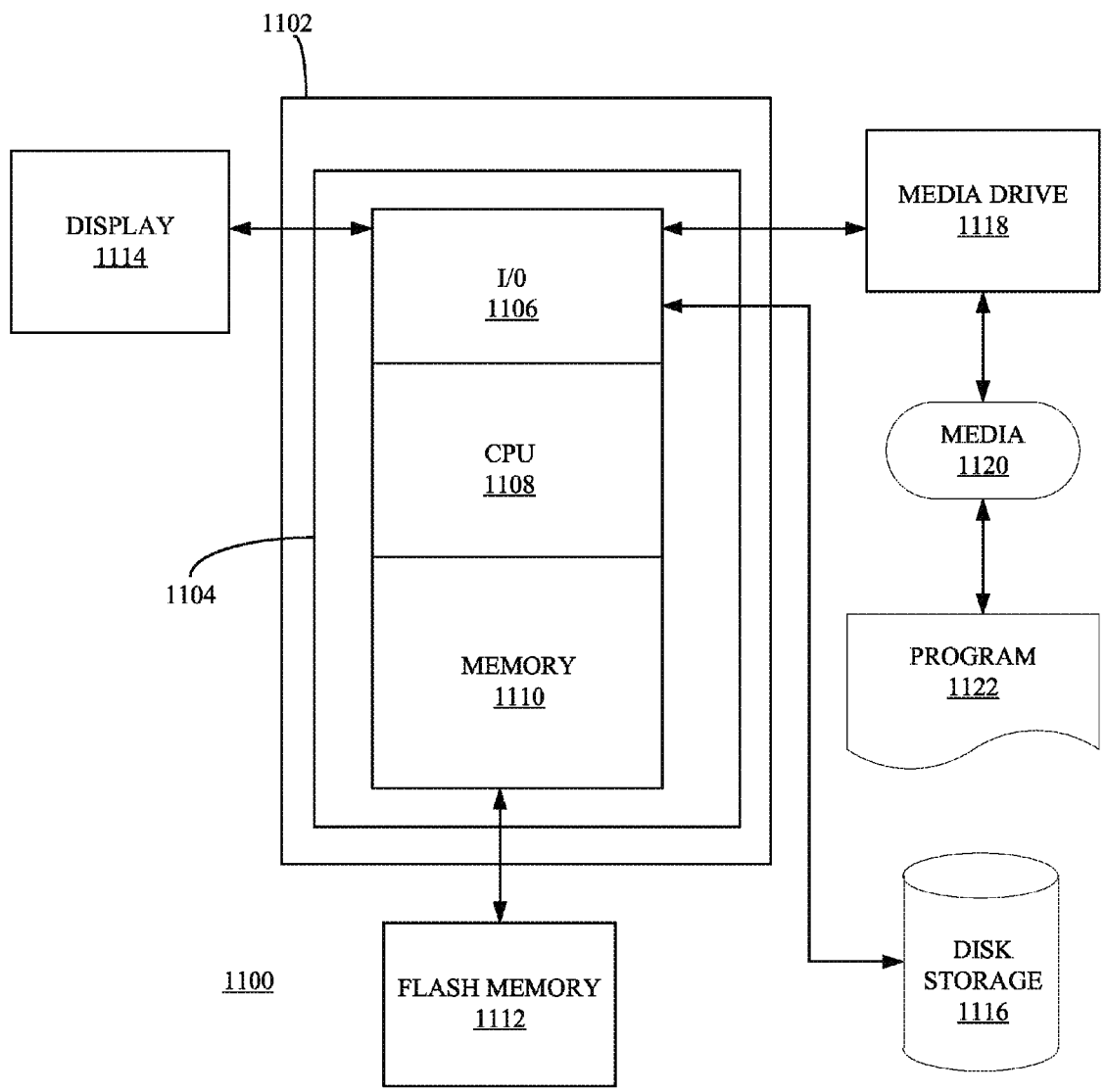
FIG. 11 depicts an exemplary computing system that can be configured to perform any one of the processes provided herein.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can be configured as a user's computing device. Accordingly, it can include a system for playing sound waves as audio (e.g. include a sound card, speaker and/or other audio systems). Additionally, FIG. 11 can include a web browser, media player and/or other client-side applications for accesses web pages and/or media content as well as systems 200 and 400. It is further noted that the systems of FIG. 11 can be integrated with FIG. 11 and configured as a server to include a server-side version of systems 200 and 400, in some embodiments.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) or some specialized application-specific language (PHP, Java Script).

B. CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
   receiving a web page with a web browser in a computing device;
   receiving a jamming trigger term from a database stored in the computing device;
   receiving a targeted age group;
   locating the jamming trigger term in the web page;
   providing an instruction to an audio system of the computing device to play a sound wave at a frequency, wherein the frequency is audible by the targeted age group but not an older age group according to an audible range of frequencies based on age groups;

playing the sound wave with the computing device while the jamming trigger term remains available in the web page; and modulating a volume of the sound wave such that the sound wave is intermittently audible by the targeted age group.

2. The computer-implemented method of claim 1, wherein the web page comprises a streaming media element.

3. The computer-implemented method of claim 1, wherein the database comprises a Web storage protocol that stores the jamming trigger term in the web browser.

4. The computer-implemented method of claim 1, wherein the step of locating the jamming trigger term in the web page further comprises:

performing a web scrapping operation on the web page after the web page is downloaded by the web browser.

5. The computer-implemented method of claim 1, wherein the targeted age group comprises persons eighteen years of age and younger and wherein the frequency comprises a substantially twenty kilo-hertz value (20 kHz).

6. The computer-implemented method of claim 1, wherein the targeted age group comprises persons eighteen years of age and younger and wherein the frequency comprises a substantially eighteen kilo-hertz value (18 kHz).

7. The computer-implemented method of claim 1, wherein the jamming trigger term is provided by a user.

8. The computer-implemented method of claim 1, wherein the audible range of frequencies based on age groups is provided by a table, and wherein the table comprises:

| Frequency | Age Group |
| --- | --- |
| 8 kHz | All Ages |
| 10 kHz | 60 & Younger |
| 12 kHz | 50 & Younger |
| 14.1 kHz | 49 & Younger |
| 14.9 kHz | 39 & Younger |
| 15.8 kHz | 30 & Younger |
| 16.7 kHz | 24 & Younger |
| 20 kHz | 18 & Younger. |

9. The computer-implemented method of claim 1 further comprising:

providing another instruction to the audio system to stop playing the sound wave if the web page is no longer displayed with the web browser.

10. A computer-implemented method comprising:
obtaining a digital media content;
obtaining targeted age-group category;
determining a sound wave frequency that is audible by the targeted age-group category, wherein the sound wave frequency is not audible by another age-group category;
obtaining a target attribute of the digital media content;
searching the digital media content for the attribute;
triggering a computing device used to provide the digital media content to a user to play a sound wave at the sound wave frequency if the target attribute is located;
playing the sound wave with the computing device while the jamming trigger term remains available in the web page; and
modulating a volume of the sound wave from a low volume to a current volume on a periodic basis.

11. The computer-implemented method of claim 10, wherein the digital media content comprises a web page.

12. The computer-implemented method of claim 10, wherein the digital media content comprises a digital audio file.

13. The computer-implemented method of claim 10, wherein the digital media content comprises a video stream.

14. The computer-implemented method of claim 10,
wherein the targeted age group comprises persons eighteen years of age and younger, and
wherein the sound wave frequency substantially comprises a value of twenty kilo-Hertz.

15. The computer-implemented method of claim 10, wherein target attribute of the digital media content comprises a restricted content as provided by a system administrator of the computing device.

16. The computer-implemented method of claim 15, wherein the restricted content comprises a ratings category associated with the digital media content.

17. The computer-implemented method of claim 15, wherein the restricted content comprises an unlicensed state of the digital media content.

18. The computer-implemented method of claim 15, wherein the restricted content comprises a key word.

19. A non-transitory computer readable medium containing program instructions for jamming specified media content based on age category, wherein execution of the program instructions by one or more processors of a computer system causes the one or more processors to carry out the steps of:
receiving a web page with a web browser in a computing device;
receiving a jamming trigger term from a database stored in the computing device;
receiving a targeted age group;
locating the jamming trigger term in the web page;
providing an instruction to an audio system of the computing device to play a sound wave at a frequency, wherein the frequency is audible by the targeted age group but not an older age group according to an audible range of frequencies based on age groups;
playing the sound wave with the computing device while the jamming trigger term remains available in the web page; and
modulating a volume of the sound wave such that the sound wave is intermittently audible by the targeted age group.

20. The non-transitory computer readable medium of claim 19,
wherein the targeted age group comprises persons eighteen years of age and younger,
wherein the sound wave frequency substantially comprises a value of twenty kilo-Hertz, and
wherein the sound wave is played during a voice-over-Internet Protocol service connection to a specified user identification.

* * * * *